July 7, 1925. 1,544,560
E. E. DAVIDSON
APPARATUS FOR BUILDING RUBBER TIRES
Filed June 2, 1921 2 Sheets-Sheet 1

Inventor
E. E. Davidson
By Robert M. Pierson
Atty.

July 7, 1925.
E. E. DAVIDSON
1,544,560
APPARATUS FOR BUILDING RUBBER TIRES
Filed June 2, 1921     2 Sheets-Sheet 2
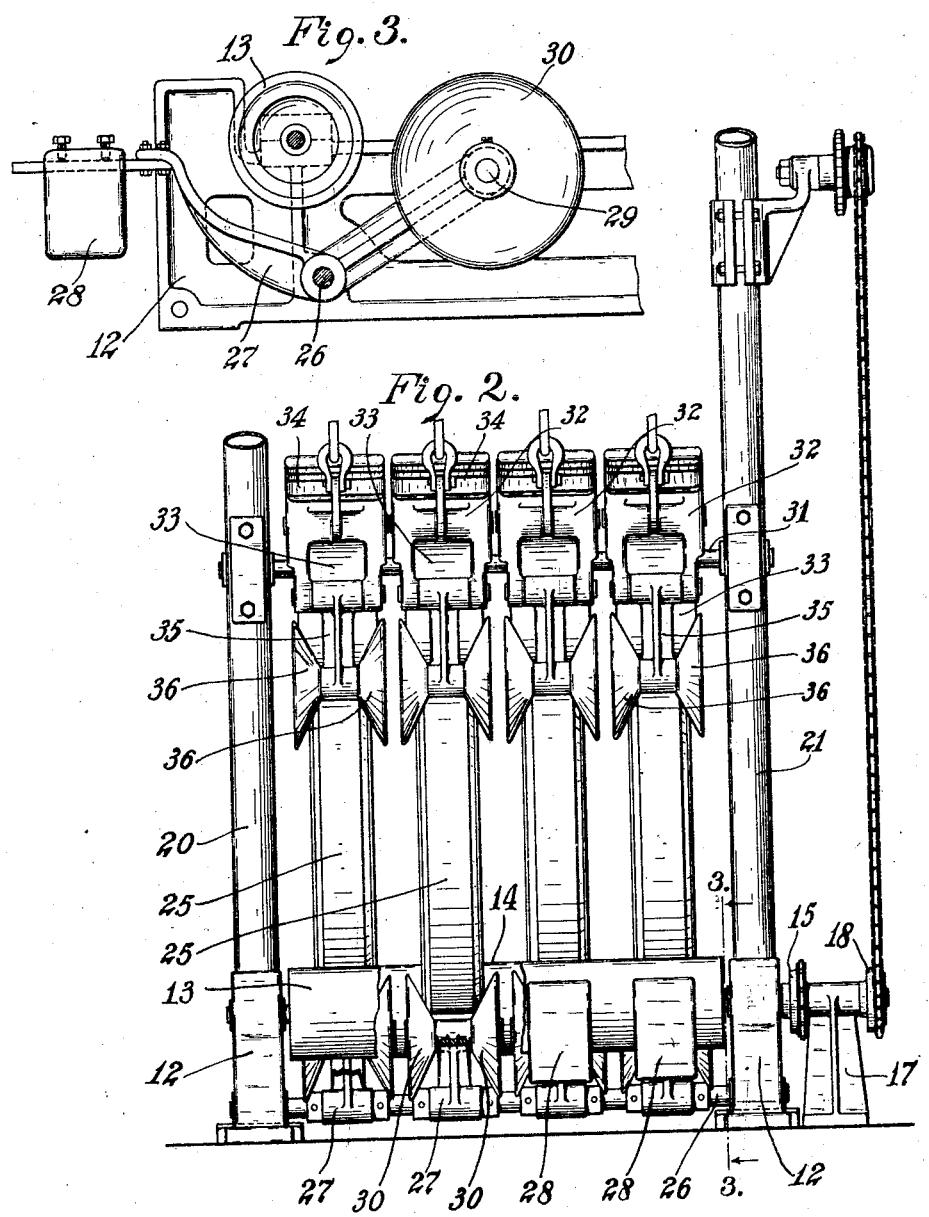
Inventor
E. E. Davidson
By Robert M. Pierson
Atty.

Patented July 7, 1925.

1,544,560

UNITED STATES PATENT OFFICE.

ELIAS E. DAVIDSON, OF AKRON, OHIO, ASSIGNOR TO THE B. F. GOODRICH COMPANY, OF NEW YORK, N. Y., A CORPORATION OF NEW YORK.

APPARATUS FOR BUILDING RUBBER TIRES.

Application filed June 2, 1921. Serial No. 474,398.

*To all whom it may concern:*

Be it known that I, ELIAS E. DAVIDSON, a citizen of the United States, residing at Akron, in the county of Summit and State of Ohio, have invented a certain new and useful Apparatus for Building Rubber Tires, of which the following is a specification.

This invention relates to tire building apparatus and more particularly to apparatus for building solid rubber tires wherein the tire-building material in strip form is drawn onto an annular tire-base or rim in successive plies or laminations by the circumferential rotation of the tire-base.

The main object of my invention is to provide improved labor-saving apparatus for the work referred to and particularly to provide simple means for peripherally supporting, driving, and compacting the work while keeping the same in accurate alignment, and thus to expedite the tire building operation and shorten the time required to insert the work in and remove it from the apparatus. Another object is to provide apparatus readily adaptable for tires of different sizes. The particular embodiment illustrated and described herein is adapted to support and circumferentially rotate annular metal base or rim members such as are used as the foundations for solid rubber tires, and to wind and press thereon successive, superimposed convolutions of uncured sheet rubber to form a laminated solid tire.

A further object is to provide an improved combination of a plurality of tire-building units adapted to be mounted close together adjacent to a calender and thus to utilize a considerable part of the full width of the stock as it comes from said calender.

Further objects and advantages will appear hereinafter.

Fig. 2 is a front end elevation of the same, partly broken away.

Fig. 3 is a section on line 3—3 of Fig. 2.

Figure 1:
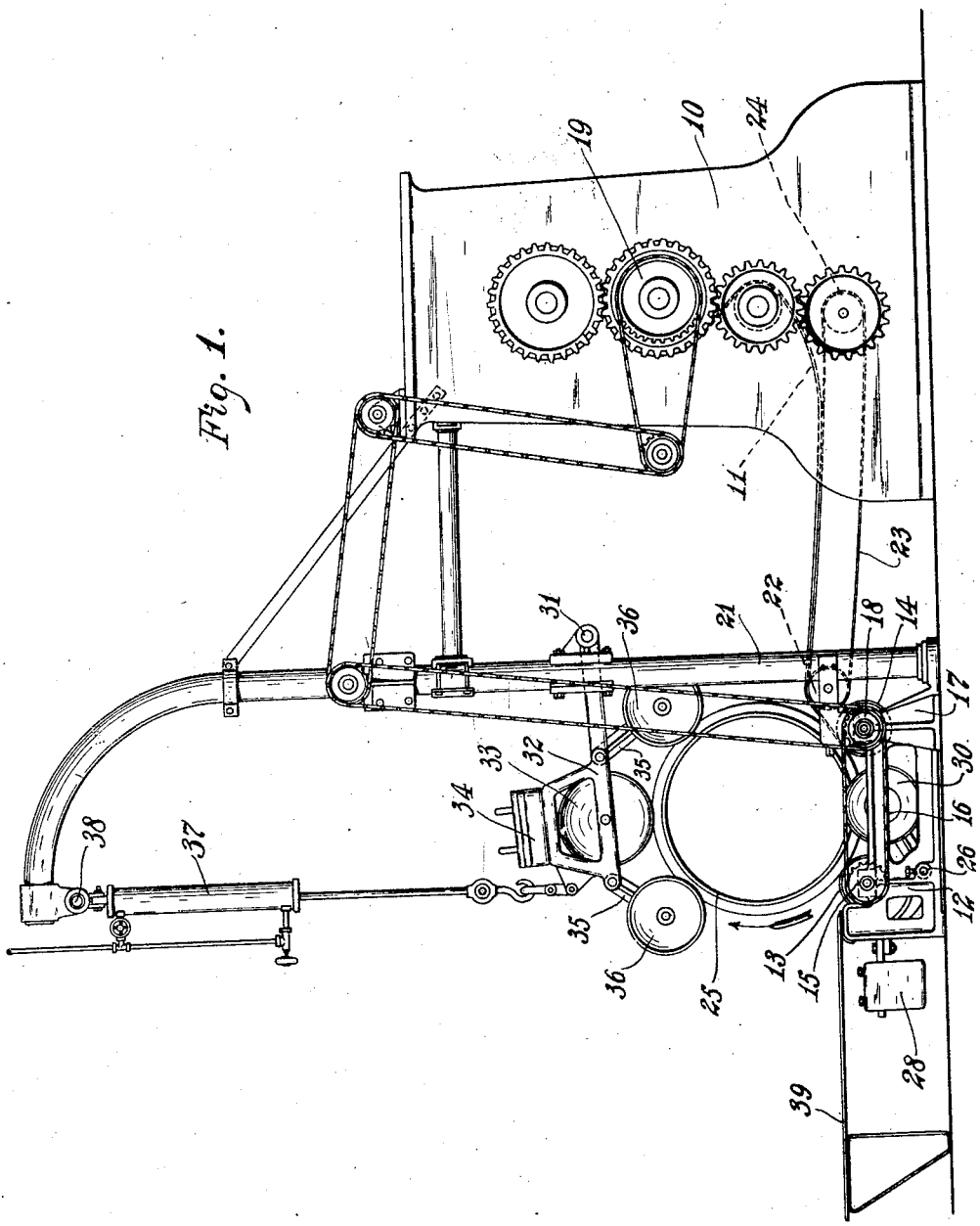
Fig. 1 is a side elevation of a preferred embodiment of my invention.

Referring to the drawings, 10 (Fig. 1) represents generally a calender adapted to supply a plurality of continuous strips of sheet rubber, 11, the sheet of stock as formed on the calender being continuously slit lengthwise at spaced intervals by the usual slitting knives (not shown).

A pair of frame members, 12, 12, are mounted upon the floor near the delivery side of the calender 10. 13, 14 are elongated work-supporting and driving rollers, preferably covered with rubber and windings of fabric thereon, journaled in the members 12, 12, in parallel relation to each other and to the calender 10. The spindles of said rollers are provided at the right-hand side of the machine with sprockets, one of which is shown at 15 for the front roller 13, said sprockets being connected by a chain 16. The journal of the rear roller, 14, extends on through an additional bearing 17 (Fig. 2) and is provided beyond said bearing with a second sprocket, 18, which is connected by other sprockets and chains, as shown in Fig. 1, with a sprocket 19 secured to one of the shafts of the calender 10, said several sprockets and chains being adapted to drive the rollers 13, 14 in the same direction, counter-clockwise as viewed in Fig. 1.

A pair of overhanging standards, 20, 21, are mounted between the frame members 12 and the calender 10 and 22 is a belt-supporting roller journaled between said standards, parallel to the rollers 13, 14, and connected by a wide carrier-belt 23 with a belt-driving roller 24 journaled in the lower part of the calender-frame, said belt being adapted to carry strips of calendered stock continuously to the work-supporting roller 14. 25, 25 are several solid tires in process of being built up on their rims.

A stationary, horizontal fulcrum shaft 26 extends between the frame members 12, 12, parallel to and underneath the front work-supporting roller 13. In spaced relation upon said shaft are pivoted a plurality of levers 27, 27, the outer ends of which are provided with adjustable weights 28, 28, said levers being individually movable about the shaft 26.

The inner end of each lever, 27, is formed with a bearing, in which is journaled a short shaft or axle 29, on whose ends are mounted, with their small ends adjacent, a pair of frusto-conical flanges or roller members forming in effect a V-grooved work-guiding roller 30, 30, each of these rollers being adapted to be raised by the weight 28 against the work, in straddling relation thereto, to align the same with relation to the slitting knives on the calender.

A stationary, horizontal shaft 31 extends between the standards 20, 21 preferably at a position slightly higher than the top of the work. In spaced relation on said shaft a plurality of levers, 32, 32, are individually pivoted, at their rear ends, each of said levers extending forward over the work in alignment with the corresponding lever 27 of the set positioned under the work as previously described. Each of said levers 32 is formed with a housing in which is journaled a presser roller 33, preferably covered with soft rubber, adapted to bear upon the work, under pressure of its own weight and that of said lever and of weights 34 superimposed thereon.

Pivotally suspended from each one of the levers 32 is a pair of arms 35, 35, each of which is formed with a bearing at its outer end, in which bearing is journaled a short shaft provided with frusto-conical roller members forming a two-part work-aligning or guiding roller 36, 36 similar to the rollers 30, 30 previously described, and adapted to hang upon and straddle the work and thus cooperate with the corresponding roller 30, to keep said work properly aligned with the slitting knives on the calender.

Each of the levers 32 is provided with an air hoist 37 suspended from a cross-bar 38 on the standards 20, 21, and adapted to raise the lever and its connections out of the way, for the insertion or removal of the work. 39 is a platform adapted to facilitate rolling the work into and out of the machine.

In the operation of this apparatus, the lever 32 is raised out of the way by means of the air hoist 37 and a tire rim is rolled from the platform 39 onto the rollers 13, 14, which are common to the several tire-building units, and over one of the grooved rollers 30, 30, the weight of the rim depressing said roller 30, 30 against the force of the weight 28. The work-driving rollers 13, 14 meanwhile being driven, through the several sprockets and chains, from the calender 10, the tire rim begins to rotate in the direction of the arrow, Fig. 1. The lever 32 is then lowered to operative position, shown in Fig. 1, by releasing the exhaust of the air hoist 37. The corresponding two grooved rollers 36, 36 straddle the top of the tire rim, bearing downwardly against it, and in cooperation with the similar roller 30, 30 at the lower side of the tire rim, properly align it. The corresponding strip of rubber stock is then brought to the tire base and started thereon by hand just above the roller 14. Thereupon said strip is continuously drawn onto the tire rim in superimposed convolutions by the rotation of the rim and each succeeding convolution is firmly pressed by the rollers 13, 14 and 33.

A further advantage of the grooved rollers is that they fold the margins of the first convolutions around the edges of the tire rim and likewise fold the margins of each succeeding convolution radially inward onto the sides of the convolution last laid and laterally press the same, whereby there is a telescoping of one ply upon another and the adhesion between plies and the shaping of the tire are improved.

When the tire has been built up to the desired thickness the strip is severed, the lever 32 is raised by the air hoist 37, the tire is rolled onto the platform 39 and removed, and the operation is repeated.

It will be observed that the work supporting and guiding means, in this embodiment, all contact the outer periphery of the work and may readily be separated therefrom, wherefore the work may be quickly inserted and removed in its own plane simply by being rolled into and out of the machine, and the stock may be run almost continuously into successive tires. Since it is not necessary to get in between the tires to mount or release the same, as where a chuck is used, for example, there is the further advantage that the rims may be mounted side-by-side, in closely assembled positions, so as to utilize a considerable part of the full width of stock as it comes from the calender.

It will be apparent that tires of different circumferential and cross-sectional sizes may be built without special adjustment of the apparatus.

Various modifications may be resorted to without departing from the scope of my invention and I do not wholly limit my claims to the specific construction shown.

I claim:

1. Apparatus for building solid tires, said apparatus comprising a horizontal roll adapted to support and drive the work by engagement with the latter's outer periphery, a plurality of grooved rollers adapted to be introduced, in straddling relation, to the outer periphery of the work by movement in the extended plane of the latter, said rollers being adapted yieldingly to bear against the work to align it on said roll, and means for feeding a strip of tire-building material onto a rim member mounted on said roll.

2. Tire-building apparatus comprising a pair of parallel rollers spaced apart and adapted to support a tire rim superimposed thereon, means for driving one of said rollers, a yieldingly mounted V-roller positioned between said parallel rollers and adapted to bear against the outer periphery of the work in straddling relation thereto, to align the work, and means for progressively feeding a strip of tire-building material longitudinally to said rim.

3. Apparatus for building vehicle tires comprising a pair of parallel rollers spaced apart and adapted to support a tire rim, means for driving said rim, a yieldingly-mounted V-roller adapted to receive the outer periphery of the work between the aforesaid rollers, and V-rollers adapted to straddle and yieldingly bear against the outer periphery of the work at other circumferential points thereon, to align the work.

4. Tire-building apparatus comprising means for peripherally supporting and driving a tire rim, a member mounted for movement in the extended plane of said rim toward and from the outer periphery of the work, a presser roller journaled on said member and adapted to engage the outer periphery of the work, and a V-roller yieldingly mounted on said member and adapted yieldingly to straddle and to align the work when said presser roller is presented thereto.

5. Tire-building apparatus comprising means for peripherally supporting and driving a tire rim, a member mounted for movement substantially in the extended plane of said rim toward and from the latter, a presser roller journaled on said member and adapted to engage the outer periphery of the work, an arm pivoted on said member, and a V-roller journaled on said arm and adapted to straddle and bear yieldingly against the work to align it when said presser roller is presented to the work.

6. Tire-building apparatus comprising means for peripherally supporting and driving a tire rim, a member mounted for movement substantially in the extended plane of said rim, a presser roller journaled on said member, and aligning means for said rim mounted on said member and adapted automatically to engage the work and to be retracted therefrom as said member is moved toward and from the work.

7. Tire-building apparatus comprising means for supporting and driving a tire rim, a V-roller adapted to straddle the outer periphery of the work, a presser roller, a common mounting for said V-roller and said presser roller, said common mounting being adapted to be moved from and toward the work in the extended plane of the latter.

8. Tire-building apparatus comprising a pair of horizontal, parallel rolls for supporting a plurality of tire rims in substantially parallel planes by engagement with their outer peripheries, means for driving said rims, aligning means for said rims adapted to engage each rim, in straddling relation, at three circumferentially spaced positions thereon, certain of said aligning means being adapted to be withdrawn outward from the work to permit the insertion and removal of each rim substantially in its own plane and means for feeding strips of tire-building material onto said rims.

9. Tire-building apparatus comprising a calender, means for peripherally supporting and driving a plurality of tire rims in position to receive tire strips from said calender, and a set of grooved rollers adapted to bear against the outer periphery of each unit of the work, in straddling relation thereto, at three circumferentially spaced stations thereon, certain of said rollers being yieldingly mounted and adapted to be moved away from the work to permit free insertion and removal of the latter in its own plane.

In witness whereof I have hereunto set my hand this 24 day of May, 1921.

ELIAS E. DAVIDSON.